US012455530B2

(12) United States Patent
Suzuki

(10) Patent No.: US 12,455,530 B2
(45) Date of Patent: Oct. 28, 2025

(54) IMAGE FORMING APPARATUS

(71) Applicant: CANON KABUSHIKI KAISHA, Tokyo (JP)

(72) Inventor: Yoshimi Suzuki, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/786,794

(22) Filed: Jul. 29, 2024

(65) Prior Publication Data

US 2025/0053132 A1 Feb. 13, 2025

(30) Foreign Application Priority Data

Aug. 10, 2023 (JP) ................................ 2023-131546

(51) Int. Cl.

*G03G 15/00* (2006.01)
*B65H 1/26* (2006.01)
*G03G 21/16* (2006.01)

(52) U.S. Cl.

CPC ......... *G03G 21/1633* (2013.01); *B65H 1/266* (2013.01); *G03G 15/6502* (2013.01); *G03G 2221/1654* (2013.01)

(58) Field of Classification Search

CPC ........... G03G 15/6502; G03G 21/1633; G03G 2221/1654; B65H 1/266
See application file for complete search history.

(56) References Cited

U.S. PATENT DOCUMENTS

| | | | | |
|---|---|---|---|---|
| 8,366,098 | B2 | 2/2013 | Kobayashi | |
| 9,045,300 | B2 | 6/2015 | Yamamoto | |
| 10,613,467 | B2 | 4/2020 | Kimura | |
| 2010/0284722 | A1* | 11/2010 | Kitayama | G03G 15/60 399/410 |
| 2015/0050042 | A1* | 2/2015 | Sato | G03G 21/1842 399/110 |
| 2017/0003635 | A1* | 1/2017 | Koga | B65H 1/266 |
| 2020/0087088 | A1* | 3/2020 | Yaginuma | B65H 1/266 |

FOREIGN PATENT DOCUMENTS

| | | |
|---|---|---|
| JP | 2008254842 A | 10/2008 |
| JP | 2012058295 A | 3/2012 |
| JP | 2014109622 A | 6/2014 |
| JP | 2019025655 A | 2/2019 |

* cited by examiner

*Primary Examiner* — Sophia S Chen
(74) *Attorney, Agent, or Firm* — ROSSI, KIMMS & McDOWELL LLP

(57) ABSTRACT

An image forming apparatus includes an apparatus body, a sheet storage portion configured to be attached to a lower portion of the apparatus body toward a first direction, an upper unit disposed on a top portion of the apparatus body, the upper unit being configured to pivot around an axis that intersects the first direction and move between a closed position and an open position, and a cover member configured to move between a first position and a second position. An edge portion of the cover member in the first direction in a case where the cover member is located in the second position is positioned in a second direction relative to a most protruding position to which an edge portion of the upper unit in the first direction protrudes to a maximum extent in the first direction.

16 Claims, 6 Drawing Sheets

IMAGE FORMING APPARATUS

BACKGROUND OF THE INVENTION

Field of the Invention

The present invention relates to an image forming apparatus that forms images on sheets.

Description of the Related Art

Japanese Patent Application Publication No. 2014-109622 describes a configuration in which when a sheet cassette that can be expanded and contracted is inserted into a casing of a printer in a state where the sheet cassette is expanded, the leading end of the sheet cassette in the insertion direction protrudes on the back side of the casing and the protruding portion of the sheet cassette is covered by a cassette cover.

However, in the configuration described in Japanese Patent Application Publication No. 2014-109622, if the printer is installed such that a side surface of the casing on the back side in the insertion direction of the sheet cassette faces a wall, the printer may be installed in an improper position. That is, since the protruding portion of the sheet cassette and the cassette cover are positioned on the back side of the casing and in a lower portion of the casing when viewed from the drawing direction of the sheet cassette, it may be difficult for a user to visually recognize the protruding portion and the cassette cover. Like this, the printer may be installed in an improper position in which when a user inserts the sheet cassette in a state where the sheet cassette is expanded, the cassette cover may interfere with a wall. If the printer is installed in the improper position, the sheet cassette may not be inserted normally, or the cassette cover or the sheet cassette may be damaged.

SUMMARY OF THE INVENTION

The present invention provides an image forming apparatus that can be less likely installed in an improper position.

According to an aspect of the invention, an image forming apparatus includes an apparatus body configured to accommodate an image forming portion configured to form an image on a sheet, the apparatus body including a side surface in a first direction having an opening, a sheet storage portion configured to store a sheet to be fed to the image forming portion, the sheet storage portion being configured to be attached to a lower portion of the apparatus body toward the first direction and drawn from the apparatus body toward a second direction opposite to the first direction, an upper unit disposed on a top portion of the apparatus body, the upper unit being configured to pivot around an axis that intersects the first direction and move between a closed position and an open position, the closed position being a position in which a bottom surface of the upper unit faces a top surface of the apparatus body, the open position being a position above the closed position, and a cover member configured to move between a first position and a second position, the first position being a position in which the cover member covers at least a part of the opening, the second position being a position retracted from the opening toward the first direction such that the cover member allows a part of the sheet storage portion to protrude from the side surface of the apparatus body through the opening in the first direction, wherein an edge portion of the cover member in the first direction in a case where the cover member is located in the second position is positioned in the second direction relative to a most protruding position to which an edge portion of the upper unit in the first direction protrudes to a maximum extent in the first direction in a period of time in which the upper unit moves from the closed position to the open position.

Further features of the present invention will become apparent from the following description of exemplary embodiments with reference to the attached drawings.

DESCRIPTION OF THE EMBODIMENTS

Hereinafter, some embodiments of the present disclosure will be described with reference to the accompanying drawings.

First Embodiment

Figure 1:
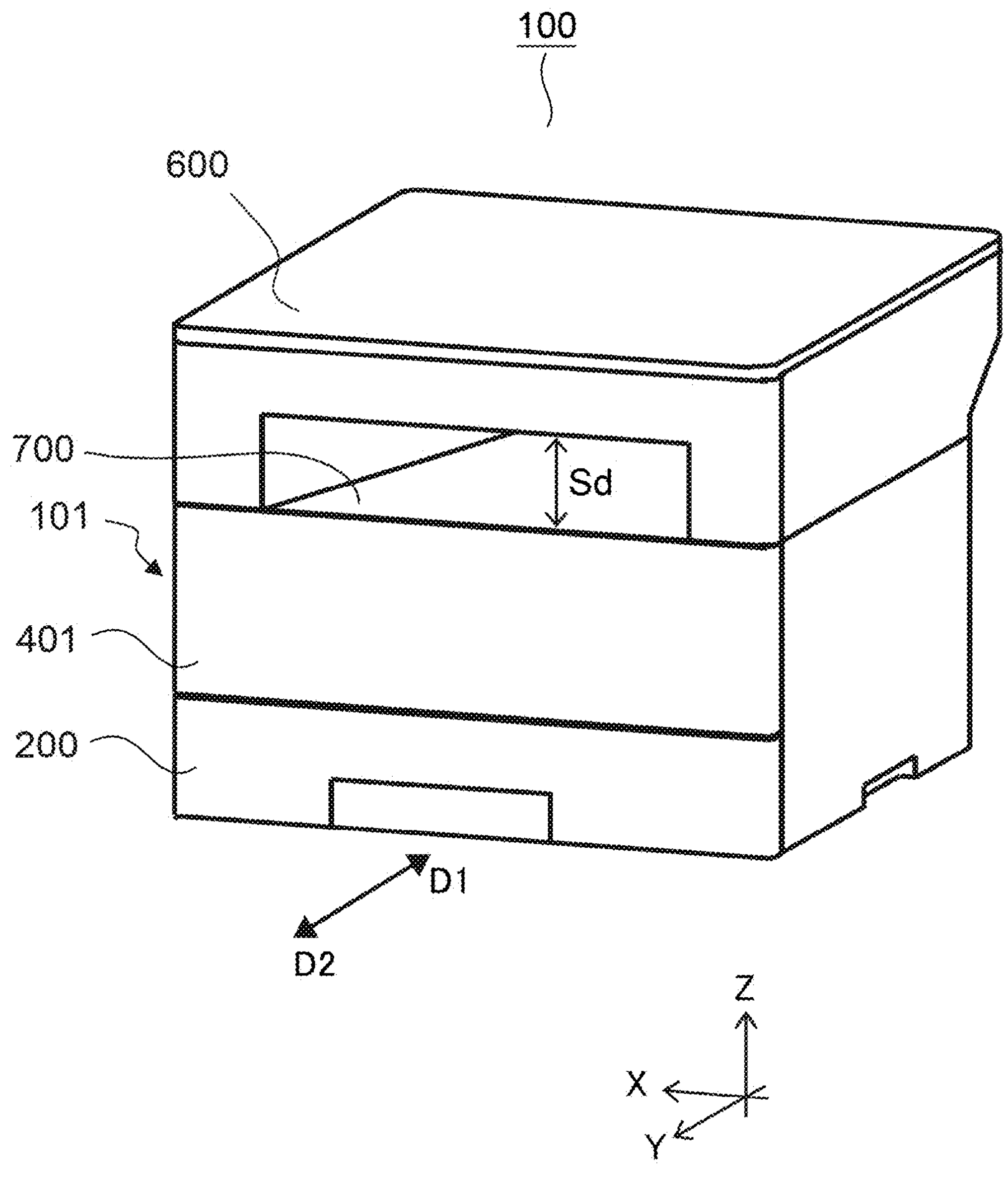
FIG. 1 is a perspective view of an image forming apparatus of a first embodiment.
Figure 2A:
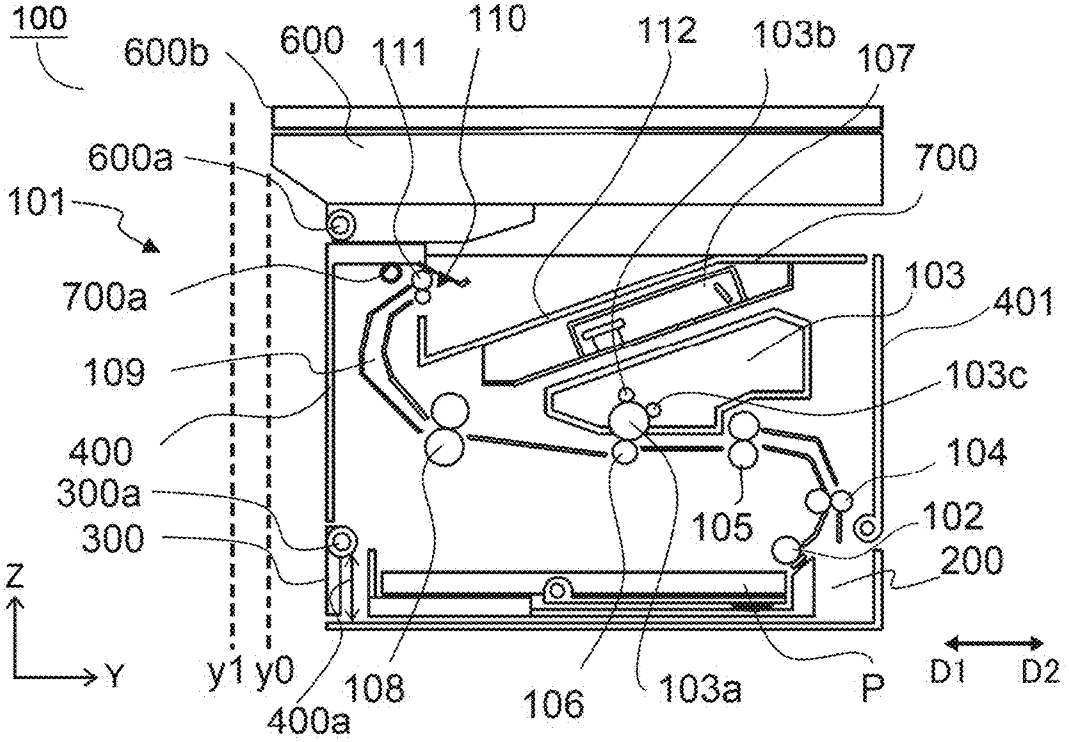
FIG. 2A is a cross-sectional view of the image forming apparatus of the first embodiment.

FIG. 1 is a perspective view of an image forming apparatus 100 of a first embodiment. FIG. 2A is a schematic diagram illustrating a cross section of the image forming apparatus 100. With reference to FIGS. 1 and 2A, a basic configuration and an image forming operation of the image forming apparatus 100 will be described.

Image Forming Apparatus

The image forming apparatus 100 is an electrophotographic apparatus that forms an image on a sheet P, based on image data. The image data may be read from a document by a below-described image reading portion 600, or may be received from an external apparatus connected with the image forming apparatus 100 via a network. The sheet P, which is a recording material (recording medium), may be any one of a variety of sheets with different sizes and materials. For example, the sheet P may be a paper sheet, such as a plain paper sheet or a thick paper sheet, a sheet material, such as a coated paper sheet, on which certain surface treatment has been performed, a specially-shaped sheet material, such as an envelope or an index paper sheet, a plastic film, or a cloth sheet. In particular, the image forming apparatus of the present embodiment can form an image also on a below-described long sheet P2.

As illustrated in FIG. 1, the image forming apparatus 100 includes an apparatus body 101 and the image reading portion 600. The image reading portion 600 is disposed on a top portion of the apparatus body 101, and serves as an upper unit. The detailed description of the image reading portion 600 will be made later. A feeding cassette 200 that stores sheets is attached to a lower portion of the apparatus body 101 such that the feeding cassette 200 can be drawn from the apparatus body 101. In addition, a discharging space Sd is formed between a top cover 700 and the image reading portion 600. The discharging space Sd is a space to which a sheet, on which an image is formed, is discharged. The top cover 700 forms a top surface of the apparatus body 101.

In the following description, the upward direction (the upward direction in the vertical direction, or the direction opposite to the gravity direction) in a case where the image forming apparatus 100 is installed on a horizontal plane is referred to as an upper direction or an upward direction. The downward direction (the downward direction in the vertical direction, or the gravity direction) in a case where the image forming apparatus 100 is installed on the horizontal plane is referred to as a lower direction or a downward direction. A direction which is of the horizontal direction orthogonal to the up and down direction, and in which a sheet is discharged toward the discharging space Sd is referred to as a front side of the image forming apparatus 100 or a frontward direction. A direction opposite to the front side or the frontward direction is referred to as a back side of the image forming apparatus 100 or a backward direction. A direction which is of the horizontal direction, and which is on the right side when viewed from the front side of the image forming apparatus 100 is referred to as a right direction of the image forming apparatus 100, and a direction opposite to the right direction is referred to as a left direction of the image forming apparatus 100.

In addition, in each of the drawings, a Z axis represents the up and down direction of the image forming apparatus 100, a Y axis represents the front and back direction of the image forming apparatus 100, and an X axis represents the right and left direction of the image forming apparatus 100. In the image forming apparatus 100 of the present embodiment, the upward direction is the positive direction of the Z axis, the downward direction is the negative direction of the Z axis, the frontward direction is the positive direction of the Y axis, the backward direction is the negative direction of the Y axis, the left direction is the positive direction of the X axis, and the right direction is the negative direction of the X axis.

As illustrated in FIG. 2A, the apparatus body 101 includes a feeding roller 102, a drawing roller pair 104, a registration roller pair (hereinafter referred to as a registration roller pair 105), a transfer roller 106, and a discharging roller pair 111. Each of these components is an example of the sheet conveyance member that conveys the sheet P along a sheet conveyance path 109 formed in the apparatus body 101. In particular, the feeding roller 102 is a feeding member that feeds the sheet P from the feeding cassette 200, and the discharging roller pair 111 is a discharging member that discharges the sheet P to the outside of the apparatus body 101. The discharging roller pair 111 is disposed in a discharging outlet 110 that is an opening of the apparatus body 101.

The apparatus body 101 includes a casing that includes a frame and an exterior or cover member. The frame is constituted by metal frames or the like. The exterior or cover member serves as an external appearance surface of the image forming apparatus 100. The exterior member includes a back cover 400 that constitutes an external appearance surface on the back side, a front cover 401 (FIG. 1) that constitutes an external appearance surface on the front side, and the top cover 700 that constitutes a top surface of the apparatus body 101. The top cover 700 includes a discharging tray 112 that serves as a stacking portion on which the sheet P, discharged by the discharging roller pair 111, is stacked.

A cover member 300 is disposed on the back side of the apparatus body 101. The cover member 300, together with the back cover 400 of the apparatus body 101, forms an external appearance surface of the image forming apparatus 100 on the back side. The detailed description of the cover member 300 will be made later.

The apparatus body 101 accommodates the feeding cassette 200 that serves as a sheet storage portion, and a process cartridge 103 that serves as an image forming portion. In the present embodiment, the apparatus body 101 is a portion of the image forming apparatus 100 other than the process cartridge 103, the feeding cassette 200, the cover member 300, and the image reading portion 600.

The feeding cassette 200 is inserted in an attachment space formed in a lower portion of the apparatus body 101. The feeding cassette 200 of the present embodiment is attached to and drawn from the apparatus body 101 in the front and back direction of the image forming apparatus 100. The direction in which the feeding cassette 200 moves when the feeding cassette 200 is attached to the apparatus body 101 is referred to as an attachment direction D1, and the direction in which the feeding cassette 200 moves when the feeding cassette 200 is drawn from the apparatus body 101 is referred to as a drawing direction D2.

The feeding cassette 200, which is a sheet storage portion of the present embodiment, can be attached to the lower portion of the apparatus body 101 in a first direction (i.e., the attachment direction D1), and can be drawn from the apparatus body 101 in a second direction (i.e., the drawing direction D2) opposite to the first direction. In the present embodiment, the attachment direction D1 is equal to the backward direction of the image forming apparatus 100, and the drawing direction D2 is equal to the frontward direction of the image forming apparatus 100. The feeding cassette 200 is referred to also as a sheet storage or a sheet tray.

Figure 2B:
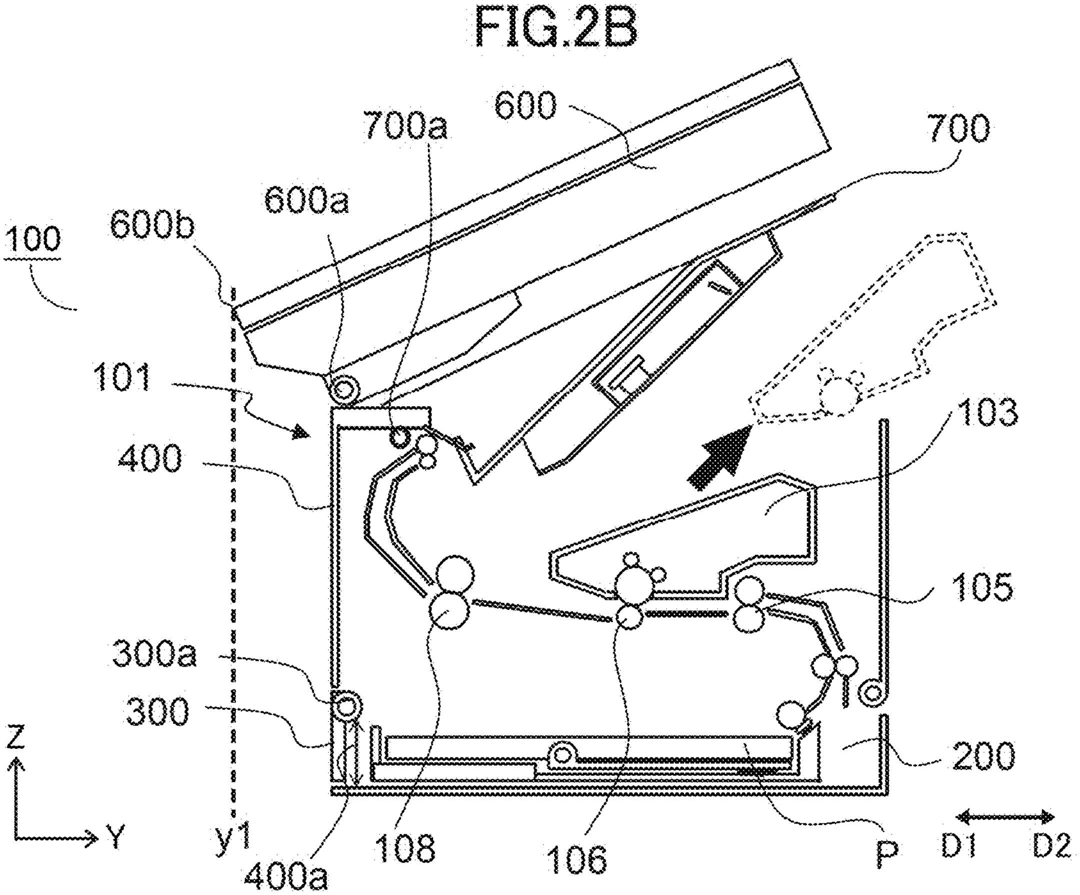
FIG. 2B is a cross-sectional view of the image forming apparatus of the first embodiment.

The process cartridge 103 is a process unit used for forming an image on the sheet P through an electrophotographic process. The process cartridge 103 can be attached to and detached from the apparatus body 101. As illustrated in FIG. 2B, a user can access an attachment space formed in the apparatus body 101, by opening the image reading portion 600 and the top cover 700; and can detachably attach the process cartridge 103 of the present embodiment, from the upper side. That is, when the cartridge is attached to or detached from the apparatus body 101, the image reading portion 600 that serves as an upper unit of the present embodiment is moved from a closed position to an open position. The top cover 700 can move between a position in which the top cover 700 closes an opening of the apparatus body 101 (through which the process cartridge 103 passes when attached to or detached from the apparatus body 101) and a position in which the top cover 700 opens the opening.

The process cartridge 103 includes a photosensitive drum 103*a* that serves as an image bearing member, a charging roller 103*b* that serves as a charging portion, a developing roller 103*c* that serves as a developing portion, and a toner storage portion that stores toner that serves as developer. The photosensitive drum 103*a* is an electrophotographic photoreceptor in which a photosensitive layer made of organic photosensitive material or the like is formed on the outer circumferential portion of a cylindrical base body. The photosensitive drum 103*a* can rotate on a rotation axis that extends in the X-axis direction.

The photosensitive drum 103*a* is in contact with the transfer roller 106 that serves as a transfer member. A transfer portion in which a toner image is transferred is formed, as a nip portion, between the transfer roller 106 and the photosensitive drum 103*a*.

Note that the process cartridge 103 is an example of a cartridge that can be detachably attached to the apparatus body 101. For example, a unit (i.e., a developing cartridge) that is of the process unit and that includes the developing roller 103*c* and the toner storage portion may be detachably attached to the apparatus body 101, independently of a unit (i.e., a drum cartridge) that includes the photosensitive drum 103*a*. In addition, a supplying container (i.e., a toner cartridge) used for supplying toner to the process unit may be detachably attached to the apparatus body 101. The developing cartridge, the drum cartridge, and the toner cartridge are examples of cartridges. In addition, instead of the process cartridge 103 that can be detachably attached to the apparatus body 101, a process unit that is integrated with the apparatus body 101 may be used.

The apparatus body 101 includes an exposure apparatus 107 that serves as an exposure portion, and a fixing apparatus 108 that serves as a fixing portion. The exposure apparatus 107 is a laser scanner that includes a laser oscillator, and an exposure optical system that guides the laser beam toward the photosensitive drum 103*a* and scans the photosensitive drum 103*a* with the laser beam. The exposure apparatus 107 may be an LED exposure apparatus that includes a plurality of LEDs. The fixing apparatus 108 has a heat fixing system. For example, the fixing apparatus 108 includes a fixing roller that serves as a heating member, a pressing roller that serves as a pressing member, and a halogen lamp that serves as a heating portion that heats the fixing roller. The heating member may be a tubular film member that has flexibility, or may be an endless belt member. In addition, the heating portion may be a ceramic heater in which a pattern that serves as a heat generating resistor is formed on a ceramic substrate, or may be a coil used for causing a conductive layer, formed in the heating member, to generate heat through induction heating.

Image Forming Operation

If an execution command (i.e., a print command) for an image forming operation is sent by a user via an operation portion included in the image forming apparatus 100 or an external apparatus connected with the image forming apparatus 100, the image forming apparatus 100 starts the image forming operation. The image forming operation is a series of operations that forms an image on the sheet P while conveying the sheet P one by one, and that discharges the sheet P on which an image is formed. The image forming apparatus 100 can execute the image forming operation in a state where the feeding cassette 200 and the process cartridge 103 are attached to the apparatus body 101, and where the top cover 700 and the image reading portion 600 are closed.

In the image forming operation, the sheet P is fed, one by one, from the feeding cassette 200 by the feeding roller 102. After that, the sheet P is conveyed along the sheet conveyance path 109 in the apparatus body 101. Note that a pad-like separation member (i.e., a friction pad) is in contact with the feeding roller 102, so that it can be prevented by the frictional force of the separation member that a plurality of sheets P are fed at a time.

The sheet P fed from the feeding cassette 200 is conveyed to the registration roller pair 105 through the drawing roller pair 104. The registration roller pair 105 corrects the skew of the sheet P, and then conveys the sheet P to the transfer portion in synchronization with the timing at which a toner image formed by the process cartridge 103 is conveyed to the transfer portion.

In parallel with the above-described conveyance operation for the sheet P, the toner image is formed by the process cartridge 103. The charging roller 103*b* uniformly charges the surface of the photosensitive drum 103*a* that is rotating, so that the surface of the photosensitive drum 103*a* has a predetermined polarity and potential. The exposure apparatus 107 emits a laser beam to the photosensitive drum 103*a* in accordance with the image data sent together with the print command, and exposes the photosensitive drum 103*a* with the laser beam. With this operation, an electrostatic latent image is formed on the surface of the photosensitive drum 103*a*. The developing roller 103*c* bears the toner, and supplies the toner to the photosensitive drum 103*a* to develop the electrostatic latent image into a toner image. In addition, in the transfer portion, the toner image is transferred from the photosensitive drum 103*a* to the sheet P, in accordance with the electric field formed between the transfer roller 106 and the photosensitive drum 103*a*.

The sheet P having passed through the transfer portion is conveyed to the fixing apparatus 108, and is subjected to the fixing process for the image. Specifically, the fixing apparatus 108 heats and presses the toner image formed on the sheet P, while causing the nip portion between the fixing roller and the pressing roller to nip and convey the sheet P. The sheet P having passed through the fixing apparatus 108 is discharged to the outside of the apparatus body 101 through the discharging outlet 110 by the discharging roller pair 111, and is stacked on the discharging tray 112.

Upper Unit

Next, the image reading portion 600 that is an example of an upper unit will be described. As illustrated in FIG. 2A, the image reading portion 600 includes an image sensor that serves as a reading portion that reads image information from a document, a platen glass on which a document is placed, and a platen cover that holds a document. The image sensor is a line sensor that includes a plurality of light receiving elements that is, for example, arrayed in the Y-axis direction, a light source such as LEDs, and a lens array that guides the light reflected from a document, to the plurality of light receiving elements. The platen cover can be opened and closed with respect to the platen glass. The image reading portion 600 obtains the image data by causing the image sensor, which moves in the X-axis direction, to optically scan a document placed on the platen glass; and transfers the obtained image data to a control portion of the apparatus body 101. Note that the image reading portion 600 may include an automatic document feeder (ADF) that automatically feeds a document.

The image reading portion 600 is disposed above the apparatus body 101, and is supported by the apparatus body 101 via a hinge portion 600*a* (i.e., a supporting portion). The hinge portion 600*a* is disposed in the vicinity of the back end of the image reading portion 600. The image reading portion 600 can pivot on the hinge portion 600*a*, with respect to the apparatus body 101. The image reading portion 600 pivots around the axis that extends in the X-axis direction. That is, the image reading portion 600 of the present embodiment pivots with respect to the apparatus body 101, around the axis that extends in a direction that intersects the attachment direction D1 (i.e., the first direction) of the feeding cassette 200.

Note that the top cover 700 can pivot with respect to the apparatus body 101, independently of the image reading portion 600. The top cover 700 is supported by a supporting portion 700*a* that is disposed closer to the back side of the apparatus body 101, and pivots around the axis that extends in the X-axis direction.

The image reading portion 600 can move between a position (i.e., a closed position) illustrated in FIG. 2A, and a position (i.e., an open position) illustrated in FIG. 2B. The closed position is a position in which the bottom surface of the image reading portion 600 faces the top surface of the apparatus body 101. The open position is a position above the closed position. In addition, the closed position is a position of the image reading portion 600 in which the image reading portion 600 is positioned when the image forming apparatus 100 performs an image forming operation. The open position is a position of the image reading portion 600 in which the image reading portion 600 is positioned when the process cartridge 103 is attached to or detached from the apparatus body 101. Note that the hinge portion 600*a* includes a stopper that prevents the image reading portion 600 from moving beyond the closed position.

As illustrated in FIG. 2B, for replacing the process cartridge 103 with another process cartridge, the image reading portion 600 is moved to the open position by pivoting the image reading portion 600 upward, and the top cover 700 is opened by pivoting the top cover 700 upward. With these operations, a user can access the process cartridge 103 through the opening of the apparatus body 101. In the present embodiment, the process cartridge 103 is separated from the apparatus body 101 toward a direction extending frontward and upward, and is attached to the apparatus body 101 toward a direction extending backward and downward.

In addition, if a failure in conveyance of a sheet P (i.e., a jam in discharging operation) is caused by the discharging roller pair 111, a user moves the image reading portion 600 to the open position for handling the jam. With this operation, the space between the top cover 700 and the image reading portion 600 is enlarged, so that the user can easily remove the sheet P that has failed in conveyance.

Next, the position of a back-end edge 600*b* of the image reading portion 600 positioned when the image reading portion 600 is opened, and the position of the back-end edge 600*b* of the image reading portion 600 positioned when the image reading portion 600 is closed will be described. The back-end edge 600*b* is an edge portion or end portion of the image reading portion 600 on the back side. The position of the back-end edge 600*b* in the front and back direction in a state where the image reading portion 600 is positioned in the closed position (FIG. 2A) is denoted by y0. As illustrated in FIG. 2B, if the image reading portion 600 is moved from the closed position to the open position, the back-end edge 600*b* moves from the position y0 to a position y1 that is behind the position y0.

When the image forming apparatus 100 is installed, it is preferable that the installation position be determined so that a wall on the back side of the image forming apparatus 100 is separated more from the image forming apparatus 100 than the position y1 is. With this installation, it can be avoided that the image reading portion 600 contacts the wall when the image reading portion 600 is moved between the closed position and the open position.

Feeding Cassette

Figure 3A:
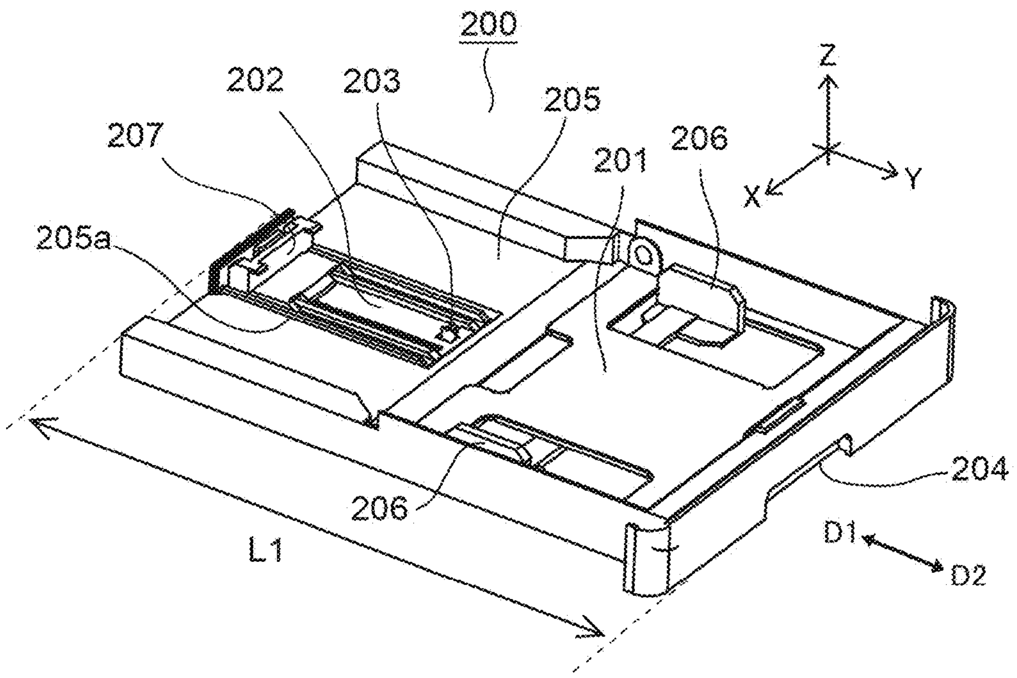
FIG. 3A is a perspective view of a feeding cassette of the first embodiment.
Figure 3B:
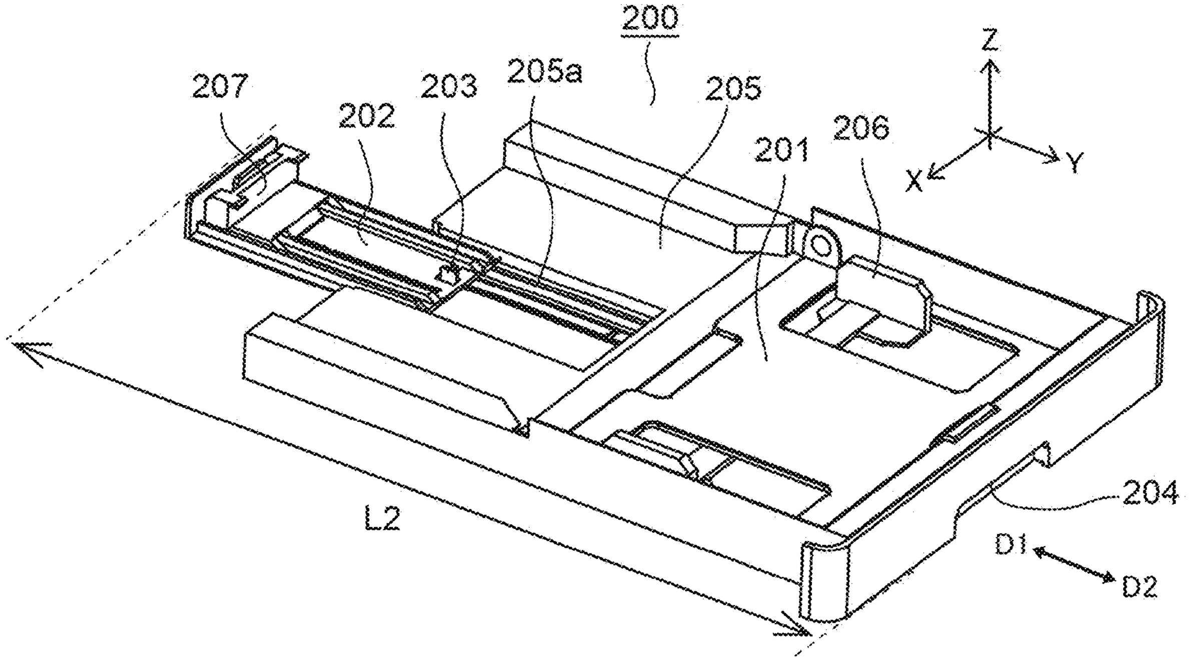
FIG. 3B is a perspective view of the feeding cassette of the first embodiment.

FIGS. 3A and 3B are perspective views of the feeding cassette 200. The feeding cassette 200 of the present embodiment can be expanded (extended) and contracted in accordance with the size of sheets stored in the feeding cassette 200. FIG. 3A illustrates the feeding cassette 200 in a non-extension state, and FIG. 3B illustrates the feeding cassette 200 in an extension state.

As illustrated in FIG. 3A, the feeding cassette 200 includes a cassette body 205, and a back-end unit 202 (i.e., a back-end extension portion) that can move with respect to the cassette body 205. The cassette body 205 includes a supporting plate 201 (i.e., a sheet supporting plate or a sheet stacking plate), a side-edge regulation portion 206, and a holding portion 204. The back-end unit 202 includes a trailing-edge regulation portion 207 and a lock mechanism 203.

The cassette body 205 is almost rectangular in a top view. The holding portion 204 is formed in a side surface of the cassette body 205 in the drawing direction D2. Thus, a user can perform an operation for attaching or drawing the feeding cassette 200, by holding the holding portion 204.

The supporting plate 201 can move up and down (or swing) with respect to the bottom surface of the cassette body 205. The supporting plate 201 supports the bottom surface of a sheet bundle that is set in the feeding cassette 200. In a state where the feeding cassette 200 is attached to the apparatus body 101, if the driving force of a motor disposed in the apparatus body 101 is transmitted to the supporting plate 201, the supporting plate 201 is lifted and the uppermost sheet of the sheet bundle abuts against the feeding roller 102 (FIG. 2A).

The side-edge regulation portion 206 regulates edge positions (i.e., side-edge positions) of sheets in a sheet width direction orthogonal to the sheet feeding direction. Since the sheet feeding direction in the present embodiment is a direction along the drawing direction D2 of the feeding cassette 200, the side-edge regulation portion 206 regulates side-edge positions of sheets in a direction (i.e., the X-axis direction) orthogonal to the drawing direction D2. The side-edge regulation portion 206 can move in the sheet width direction in accordance with the size of sheets. The side-edge regulation portion 206 includes a pair of regulation plates that face each other in the sheet width direction. For example, the regulation plates, which forms a pair, are linked with each other via a rack-and-pinion mechanism, and are moved together, keeping a positional relationship in which the regulation plates are symmetrical with respect to a conveyance reference (i.e., a central position of the feeding roller 102) in the sheet width direction.

The trailing-edge regulation portion 207 regulates the position of the trailing edge of sheets (i.e., the upstream edge of sheets in the sheet feeding direction). Since the sheet feeding direction in the present embodiment is a direction along the drawing direction D2 of the feeding cassette 200, the trailing-edge regulation portion 207 regulates an edge portion of sheets opposite to the drawing direction D2 (i.e., an edge portion of sheets on the attachment direction D1 side). The trailing-edge regulation portion 207 can be moved in the sheet feeding direction in accordance with the size of sheets, by the movement of the back-end unit 202.

The back-end unit 202 can move with respect to the cassette body 205 in the attachment direction D1 and the drawing direction D2, along a groove portion 205*a* formed in the cassette body 205. The back-end unit 202 is locked on the cassette body 205, by the lock mechanism 203. In addition, a user can move the back-end unit 202 by unlocking the back-end unit 202, by operating the lock mechanism 203.

The back-end unit 202 can move between a non-extension position illustrated in FIG. 3A, and an extension position illustrated in FIG. 3B. A state of the feeding cassette 200 in which the back-end unit 202 is positioned in the non-extension position is referred to as a non-extension state (i.e., a contraction state), and a state of the feeding cassette 200 in which the back-end unit 202 is positioned in the extension position is referred to as an extension state (i.e., an expansion state).

The trailing-edge regulation portion 207 located when the back-end unit 202 is positioned in the extension position is positioned upstream (or on the back side) of the trailing-edge regulation portion 207 located when the back-end unit 202 is positioned in the non-extension position, in the sheet feeding direction. Thus, longer sheets can be set in the feeding cassette 200 by moving the back-end unit 202 from the non-extension position to the extension position. Note that the back-end unit 202 may be locked at any position between the non-extension position illustrated in FIG. 3A and the extension position illustrated in FIG. 3B, in accordance with the size of sheets.

Hereinafter, a sheet having a length that disables the feeding cassette 200 to store the sheet in a case where the back-end unit 202 is positioned in the non-extension position, and that enables the feeding cassette 200 to store the sheet in a case where the back-end unit 202 is positioned in the extension position is referred to as a long sheet P2. The long sheet P2 may be longer than the total length of the feeding cassette 200 in a case where the back-end unit 202 is positioned in the non-extension position. The long sheet P2 may be longer than the width of the apparatus body 101 in the front and back direction. Note that the sheet P illustrated in FIGS. 2A and 2B has a length that enables the feeding cassette 200 to store the sheet P in a case where the back-end unit 202 is positioned in the non-extension position.

As illustrated in FIG. 3B, in a case where the back-end unit 202 is positioned in the extension position, the back-end unit 202 protrudes from the cassette body 205 in the attachment direction D1. That is, a length L2 of the feeding cassette 200 in the extension state is longer than a length L1 (FIG. 3A) of the feeding cassette 200 in the non-extension state, in the front and back direction of the image forming apparatus 100.

That is, the state of the feeding cassette 200, which serves as a sheet storage portion of the present embodiment, can be switched between a first state (i.e., the non-extension state) and a second state (i.e., the extension state). The first state is a state where the length of the feeding cassette 200 in the attachment direction D1 (i.e., the first direction) is a first length L1. The second state is a state where the length of the feeding cassette 200 in the attachment direction D1 (i.e., the first direction) is a second length L2 longer than the first length L1, and where the feeding cassette 200 can store longer sheets than those sheets that can be stored in the feeding cassette 200 of the first state.

Figure 4:
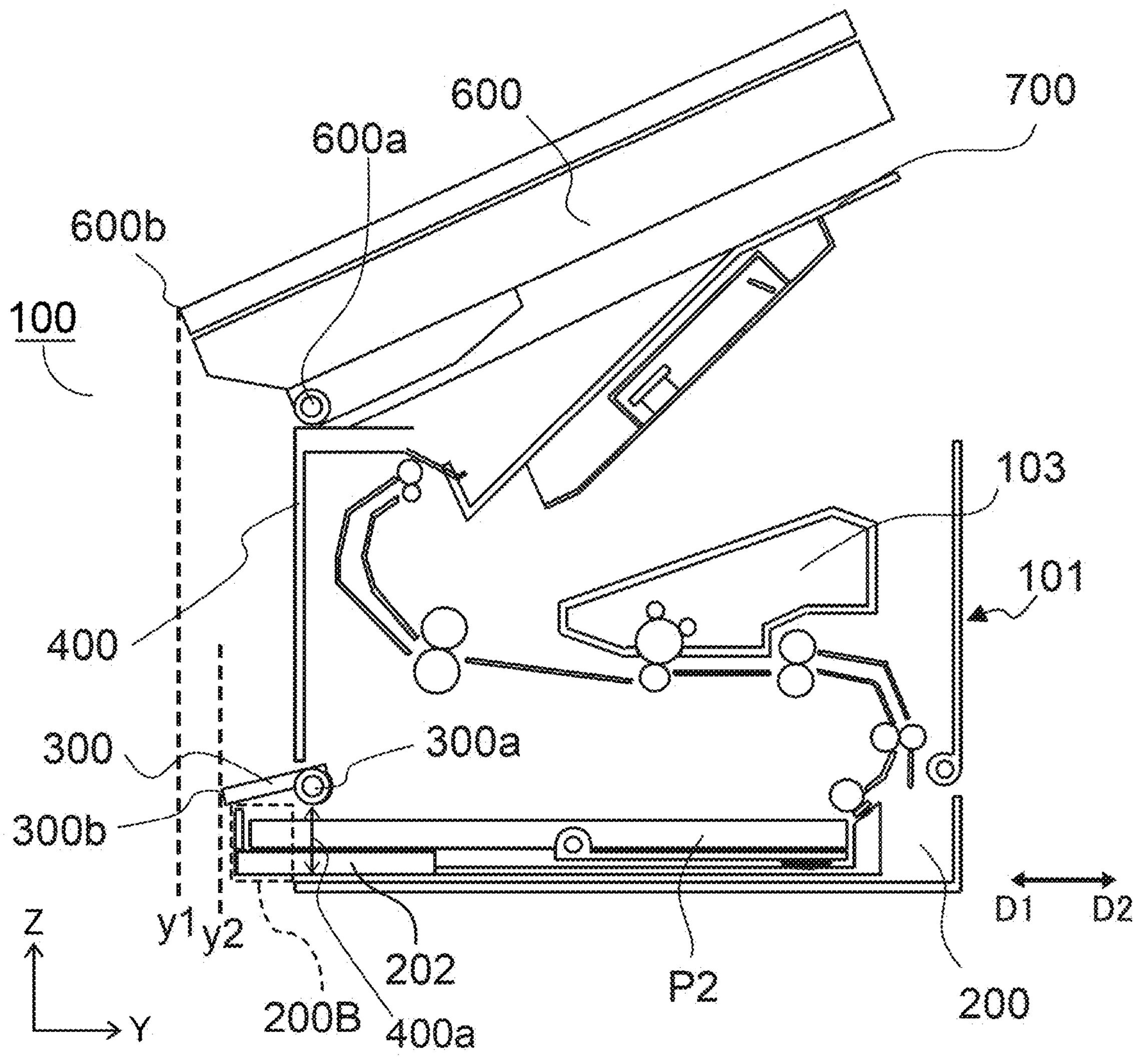
FIG. 4 is a cross-sectional view of the image forming apparatus of the first embodiment.

As illustrated in FIG. 4, if the feeding cassette 200 in the extension state is attached to the apparatus body 101, the leading end of the feeding cassette 200 in the attachment direction D1 protrudes downstream in the attachment direction D1, from the back cover 400 of the apparatus body 101. That is, a part (i.e., a protruding portion 200B) of the feeding cassette 200 on the back-end side protrudes backward from the back cover 400 of the apparatus body 101. The back cover 400 has an opening 400*a* formed so as to allow the part (i.e., the protruding portion 200B) of the feeding cassette 200 to protrude downstream in the attachment direction D1. As described below, the protruding portion 200B of the feeding cassette 200 is covered by the cover member 300 from above.

Note that as illustrated in FIG. 2A, if the feeding cassette 200 in the non-extension state is attached to the apparatus body 101, the leading end of the feeding cassette 200 in the attachment direction D1 does not protrude downstream in the attachment direction D1, from the back cover 400 of the apparatus body 101. Preferably, in this state, the leading end of the feeding cassette 200 in the attachment direction D1 is positioned inside the apparatus body 101 with respect to the back cover 400 of the apparatus body 101 (that is, the leading end of the feeding cassette 200 in the attachment direction D1 is positioned in a position retracted from the back cover 400 in the drawing direction D2). In a case where a sheet P other than the long sheet is used, the footprint (i.e., the contact area) of the image forming apparatus 100 can be decreased by setting the state of the feeding cassette 200 to the non-extension state.

Note that the image forming apparatus 100 of the present embodiment includes a sheet conveyance path of a so-called S-pass type in which the sheet feeding direction from the feeding cassette 200 is almost the same as the sheet discharging direction from the apparatus body 101. That is, both of the sheet feeding direction from the feeding cassette 200 and the sheet discharging direction from the apparatus body 101 are oriented toward the same side in the Y-axis direction (i.e., the front side of the image forming apparatus 100). In addition, the sheet P is conveyed toward a direction opposite to the sheet feeding direction and the sheet discharging direction in the Y-axis direction, in a space between the feeding cassette 200 and the discharging tray 112 in the up and down direction.

Since the feeding roller 102 is a portion of the apparatus body 101, it is difficult to change the position of the feeding roller 102 in accordance with the expansion and contraction of the feeding cassette 200. For this reason, in a case where the feeding cassette 200 can be expanded and contracted, the feeding cassette 200 is extended upstream in the sheet feeding direction. Thus, in a case where the feeding cassette 200 is extended in the image forming apparatus 100 that includes the sheet conveyance path of the S-pass type, the feeding cassette 200 is extended toward a direction opposite to the sheet discharging direction, that is, toward the back side of the image forming apparatus 100.

Thus, the configuration described below can be suitably embodied in an image forming apparatus that includes a sheet conveyance path of the S-pass type. However, the configuration described below may be applied also to an image forming apparatus that includes a sheet conveyance path of another type other than the S-pass type, as long as the feeding cassette 200 protrudes from the apparatus body 101 toward the back side in the attachment direction D1 of the feeding cassette 200.

Cover Member

Next, the cover member 300 will be described. As illustrated in FIGS. 2A and 4, the cover member 300 is disposed on a lower portion of the apparatus body 101 on the back side. The cover member 300 of the present embodiment is supported by a supporting portion 300*a*, so as to be able to pivot with respect to the apparatus body 101. The cover member 300 pivots on the supporting portion 300*a*, around the axis that extends in the X-axis direction.

The cover member 300 can move between a retracted position (i.e., a first position or a closed position) illustrated in FIG. 2A, and a protruding position (i.e., a second position or an open position) illustrated in FIG. 4. The protruding position is a position in which a leading edge 300*b* of the cover member 300 protrudes backward from the back cover 400 of the apparatus body 101. In addition, the protruding position is a position retracted from the opening 400*a* toward the attachment direction D1 so that the part (i.e., the protruding portion 200B) of the feeding cassette 200 is allowed to protrude from the back cover 400 in the attachment direction D1, through the opening 400*a* of the back cover 400. The retracted position is a position in which the cover member 300 is retracted frontward from the protruding position. In addition, the retracted position is a position in which the cover member 300 covers at least a part of the opening 400*a* of the back cover 400 when viewed from the back side of the apparatus body 101. That is, the cover member 300 can move between a second position in which the cover member 300 protrudes in the attachment direction D1, from a side surface of the apparatus body 101 in the attachment direction D1 (i.e., the first direction), and a first position in which the cover member 300 is retracted from the second position in the drawing direction D2 (i.e., the second direction).

In the present embodiment, the cover member 300 moves to the protruding position by pivoting upward from the retracted position, and moves to the retracted position by pivoting downward from the protruding position. In addition, the cover member 300 of the present embodiment moves from the retracted position to the protruding position by the feeding cassette 200 pushing the cover member 300 when the feeding cassette 200 in the extension state is attached to the apparatus body 101. More specifically, the cover member 300 is pushed by the back-end unit 202 of the feeding cassette 200.

The positional relationship between the feeding cassette 200 and the cover member 300 will be further described. As illustrated in FIG. 2B, in a state where the feeding cassette 200 in the non-extension state is attached to the apparatus body 101, the cover member 300 is positioned in the retracted position. In this case, the cover member 300 covers the opening 400*a* (the protruding portion 200B of the feeding cassette 200) of the apparatus body 101, and forms, together with the back cover 400, the external appearance surface of the image forming apparatus 100 on the back side.

On the other hand, as illustrated in FIG. 4, in a state where the feeding cassette 200 in the extension state is attached to the apparatus body 101, the cover member 300 is positioned in the protruding position. The cover member 300 in the protruding position covers the protruding portion 200B of the feeding cassette 200 at least partially when viewed from above. That is, in a state where a part of the feeding cassette 200 (i.e., a sheet storage portion) attached to the apparatus body 101 protrudes from the side surface (i.e., the back cover 400) of the apparatus body 101 in the attachment direction D1 (i.e., the first direction), the cover member 300 is located in the protruding position (i.e., the second position), and covers the part of the feeding cassette 200 when viewed from above.

In this configuration, it is possible to prevent foreign substance from falling from the protruding portion 200B into the feeding cassette 200, and from accumulating on the long sheet P2. As a result, the possibility that causes the failure in conveyance can be reduced. Preferably, the cover member 300 in the protruding position covers the whole of the protruding portion 200B of the feeding cassette 200 when viewed from above.

As illustrated in FIG. 4, a back-end position y2 of the cover member 300 located in the protruding position is positioned in front of the back-end position y1 of the image reading portion 600 located in the open position. In other words, in the present embodiment, the edge position of the cover member in the first direction in a case where the cover member is located in the second position is positioned in the second direction, relative to the edge position of the upper unit in the first direction in a case where the upper unit is located in the open position.

In other words, if the position of the edge portion (i.e., the back-end edge 600*b*) of the upper unit located in the closed position is defined as a third position (y0), and the position of the edge portion of the upper unit located in the open position is defined as a fourth position (y1), the fourth position is positioned in the first direction relative to the third position. In addition, the edge portion (i.e., the leading edge 300*b*) of the cover member in the first direction in a case where the cover member is located in the second position is positioned in the second direction relative to the fourth position.

In this configuration, in a case where the feeding cassette 200 in the extension state is attached to the apparatus body 101, the possibility that the image forming apparatus 100 is installed in an improper installation position, such as a position in which the cover member 300 interferes with a wall behind the image forming apparatus 100, can be reduced. Since the image reading portion 600 is disposed on a top portion of the apparatus body 101, it is easy for a user to visually recognize the image reading portion 600 and estimate the distance between the image reading portion 600 and the wall. Thus, the user can determine the installation position of the image forming apparatus 100 so that the back-end edge 600*b* of the image reading portion 600 does not interfere with the wall when the user opens the image reading portion 600. As described above, the back-end position y2 of the cover member 300 is positioned in front of the back-end position y1 of the image reading portion 600. Thus, if the back-end edge 600*b* of the image reading portion 600 does not interfere with the wall behind the image reading portion 600 as described above, the cover member 300 also does not interfere with the wall behind the image reading portion 600, under normal circumstances. Thus, the user can install the image forming apparatus 100 in a proper position without checking the position of the cover member 300 that is difficult to visually recognize unlike the image reading portion 600 (in particular, the position of the cover member 300 to which the cover member 300 is moved). As a result, the installation work for the image forming apparatus 100 will become easy.

Note that in the present embodiment, the back-end position y1 of the image reading portion 600 located in the open position is the maximum protruding point of the image reading portion 600, to which the image reading portion 600 protrudes backward to the maximum extent in a process in which the image reading portion 600 moves from the closed position to the open position. That is, the back-end position y1 is an example of the back-end position of the upper unit in the first direction, to which the upper unit protrudes to the maximum extent in the first direction in a process in which the upper unit moves from the closed position to the open position. In other words, the back-end position y1 of the present embodiment is an example of the most protruding position to which the edge portion of the upper unit protrudes to the maximum extent in the first direction in a period of time in which the upper unit moves from the closed position to the open position.

In the present embodiment, as an example, the maximum protruding point of the image reading portion 600 (i.e., the most protruding position of the upper unit) is equal to the position (i.e., the fourth position) of the edge portion (i.e., the back-end edge 600*b*) of the image reading portion located in the open position. However, the same advantageous effects as those of the present embodiment can be produced if the back-end position y2 of the cover member 300 located in the protruding position is at least in front of the maximum protruding point of the image reading portion 600. This is because a user can install the image forming apparatus 100 while checking the trajectory of pivot of the image reading portion 600, which is on the top portion of the apparatus body 101 and which is easy to visually recognize.

Thus, in the present embodiment, it is possible to provide an image forming apparatus that is unlikely installed in an improper position.

By the way, the back-end position y2 of the cover member 300 located in the protruding position may be behind the back-end position y0 (i.e., the third position) of the image reading portion 600 located in the closed position, and may be in front of the back-end position y1 (i.e., the fourth position) of the image reading portion 600 located in the open position. That is, the edge portion of the cover member located in the second position may be positioned between the third position and the fourth position in the first direction.

Note that the maximum protruding point of the image reading portion 600 may not be the position of the back-end edge 600*b* obtained when the image reading portion 600 is located in the open position or the closed position. For example, the maximum protruding point of the image reading portion 600 may be a position of the back-end edge 600*b* obtained when the image reading portion 600 is located in a position between the open position and the closed position. That is, the most protruding position of the upper unit may be a position of the edge portion of the upper unit located in a position between the closed position and the open position.

Second Embodiment

Next, an image forming apparatus of a second embodiment will be described with reference to FIGS. 5A and 5B. Hereinafter, a component given a reference symbol identical to a reference symbol of a component of the first embodiment has basically the same structure and effect as those of the component described in the first embodiment, unless otherwise specified, and features different from those of the first embodiment will be mainly described.

Figure 5A:
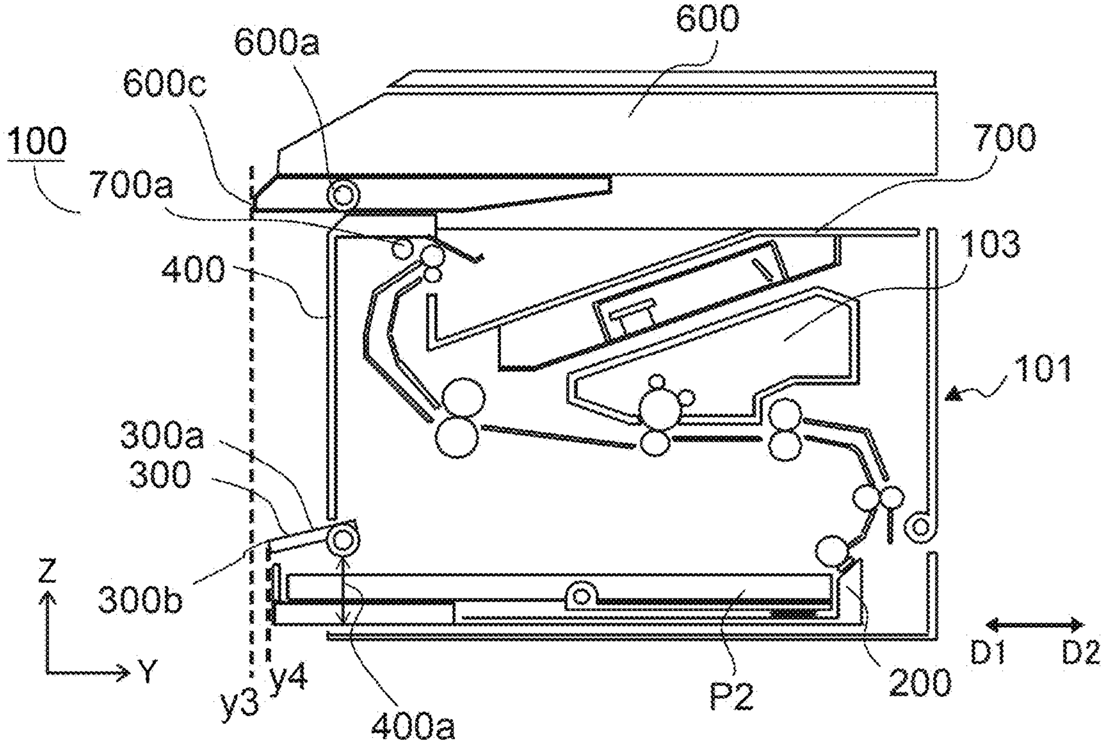
FIG. 5A is a cross-sectional view of an image forming apparatus of a second embodiment.
Figure 5B:
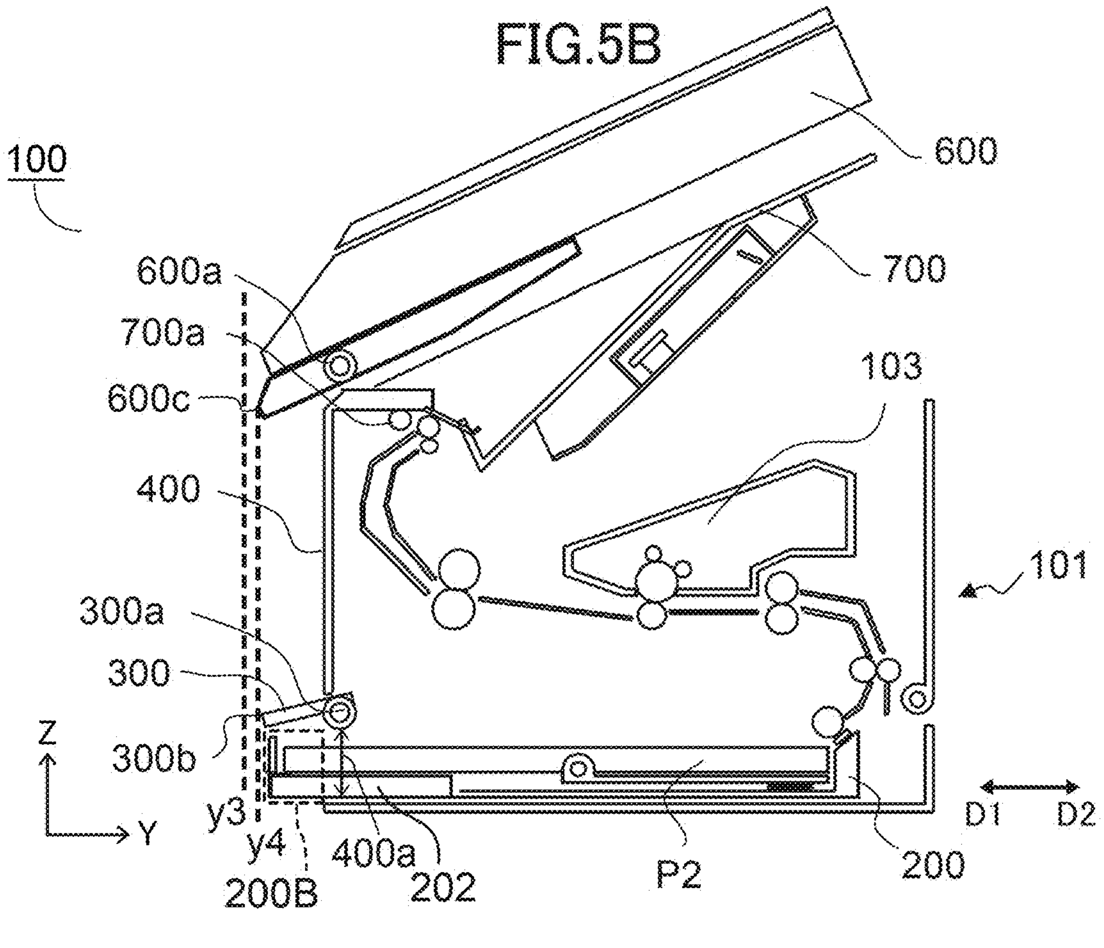
FIG. 5B is a cross-sectional view of the image forming apparatus of the second embodiment.

Each of FIGS. 5A and 5B is a schematic diagram illustrating an image forming apparatus 100 of the second embodiment. FIG. 5A illustrates an image reading portion 600 located in a closed position, and FIG. 5B illustrates the image reading portion 600 located in an open position. In the present embodiment, a back-end edge 600*c* of the image reading portion 600 located in the closed position is positioned behind the back-end edge 600*c* of the image reading portion 600 located in the open position. That is, in the front and back direction of the image forming apparatus 100, a back-end position y3 of the image reading portion 600 located in the closed position is positioned behind a back-end position y4 of the image reading portion 600 located in the open position.

In other words, if the position of the edge portion (i.e., the back-end edge 600*c*) of the upper unit located in the closed position is defined as a third position (y3), and the position of the edge portion of the upper unit located in the open position is defined as a fourth position (y4), the third position is positioned in the first direction relative to the fourth position. In addition, the edge portion (i.e., the leading edge 300*b*) of the cover member in the first direction in a case where the cover member is located in the second position is positioned in the second direction relative to the third position.

In the present embodiment, the back-end position y3 of the image reading portion 600 located in the closed position is the maximum protruding point of the image reading portion 600, to which the image reading portion 600 protrudes backward to the maximum extent in a process in which the image reading portion 600 moves from the closed position to the open position. The back-end position y2 of the cover member 300 located in the protruding position is positioned in front of the back-end position y3 that is the maximum protruding point. The back-end position y3 is an example of the most protruding position to which the edge portion of the upper unit in the first direction protrudes to the maximum extent in the first direction in a period of time in which the upper unit moves from the closed position to the open position. In the present embodiment, the maximum protruding point of the image reading portion 600 (i.e., the most protruding position of the upper unit) is equal to the position (i.e., the third position) of the edge portion (i.e., the back-end edge 600*b*) of the image reading portion located in the closed position.

That is, also in the present embodiment, the edge position of the cover member in the first direction in a case where the cover member is located in the second position is positioned in the second direction, relative to the edge position of the upper unit in the first direction in a case where the upper unit protrudes to the maximum extent in the first direction in a process in which the upper unit moves from the closed position to the open position. Thus, as in the first embodiment, it is possible to provide an image forming apparatus that is unlikely installed in an improper position.

In addition, in the present embodiment, when the image reading portion 600, which serves as an upper unit, is moved from the closed position to the open position, the back-end edge 600*c* does not move backward. Thus, even in a case where the image forming apparatus 100 is installed closer to a wall on the back side, it is possible to prevent the back-end edge 600*c* of the image reading portion 600 from interfering with the wall when the image reading portion 600 is opened for, for example, replacing the process cartridge 103 with another after the installation of the image forming apparatus 100. Thus, in the present embodiment, the installation work for the image forming apparatus 100 can be made further easier.

Modification

In the second embodiment, the back-end position y2 of the cover member 300 located in the protruding position may be positioned in front of the back-end position y3 (i.e., the third position) of the image reading portion 600 located in the closed position, and may be positioned behind the back-end position y4 (i.e., the fourth position) of the image reading portion 600 located in the open position. That is, the edge portion of the cover member located in the second position may be positioned between the third position and the fourth position in the first direction. The back-end position of the feeding cassette 200 in the extension state may be positioned in front of the back-end position y3 of the image reading portion 600 located in the closed position, and may be positioned behind the back-end position y4 of the image reading portion 600 located in the open position. Even in this configuration, it is possible to provide an image forming apparatus that is unlikely installed in an improper position.

In the second embodiment and the present modification, the edge position of the cover member in the first direction in a case where the cover member is located in the second position is positioned in the second direction, relative to the edge position of the upper unit in the first direction in a case where the upper unit is located in the closed position. Thus, if a user installs the image forming apparatus in a state where the upper unit is positioned in the closed position, it can be avoided accordingly that the image forming apparatus is installed in an improper position.

Third Embodiment

Next, an image forming apparatus of a third embodiment will be described with reference to FIGS. 6A and 6B. Hereinafter, a component given a reference symbol identical to a reference symbol of a component of the first embodiment has basically the same structure and effect as those of the component described in the first embodiment, unless otherwise specified, and features different from those of the first embodiment will be mainly described.

Figure 6A:
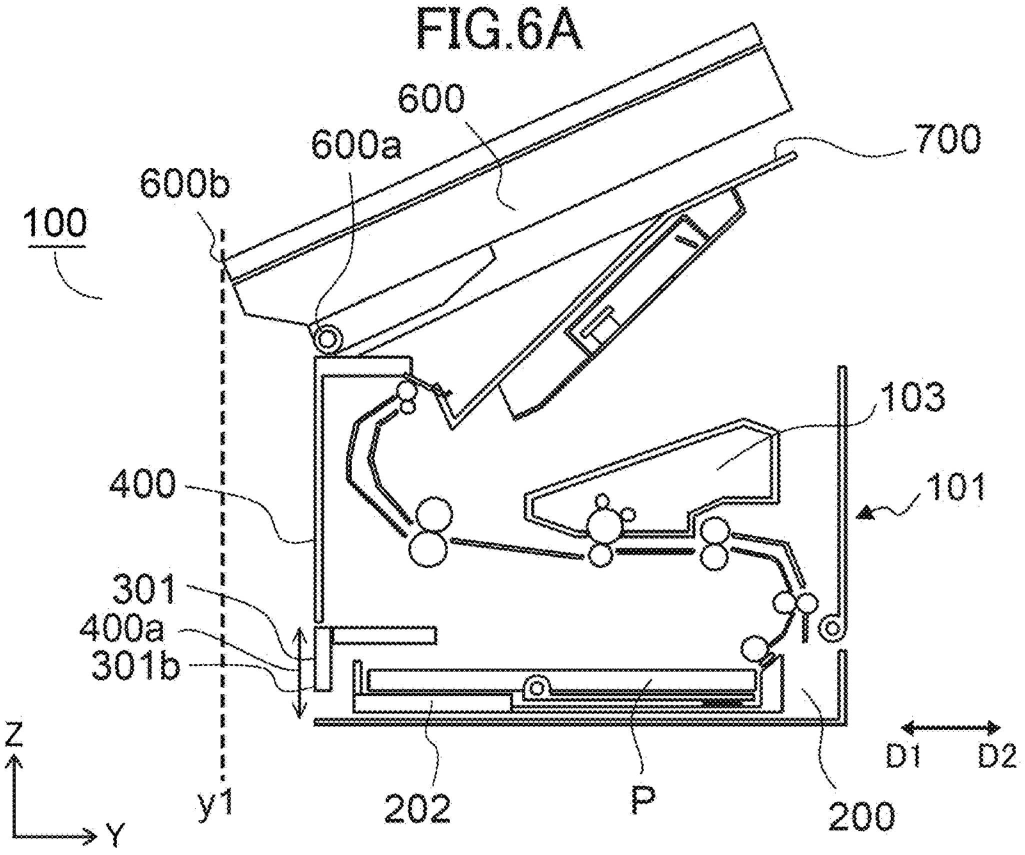
FIG. 6A is a cross-sectional view of an image forming apparatus of a third embodiment.
Figure 6B:
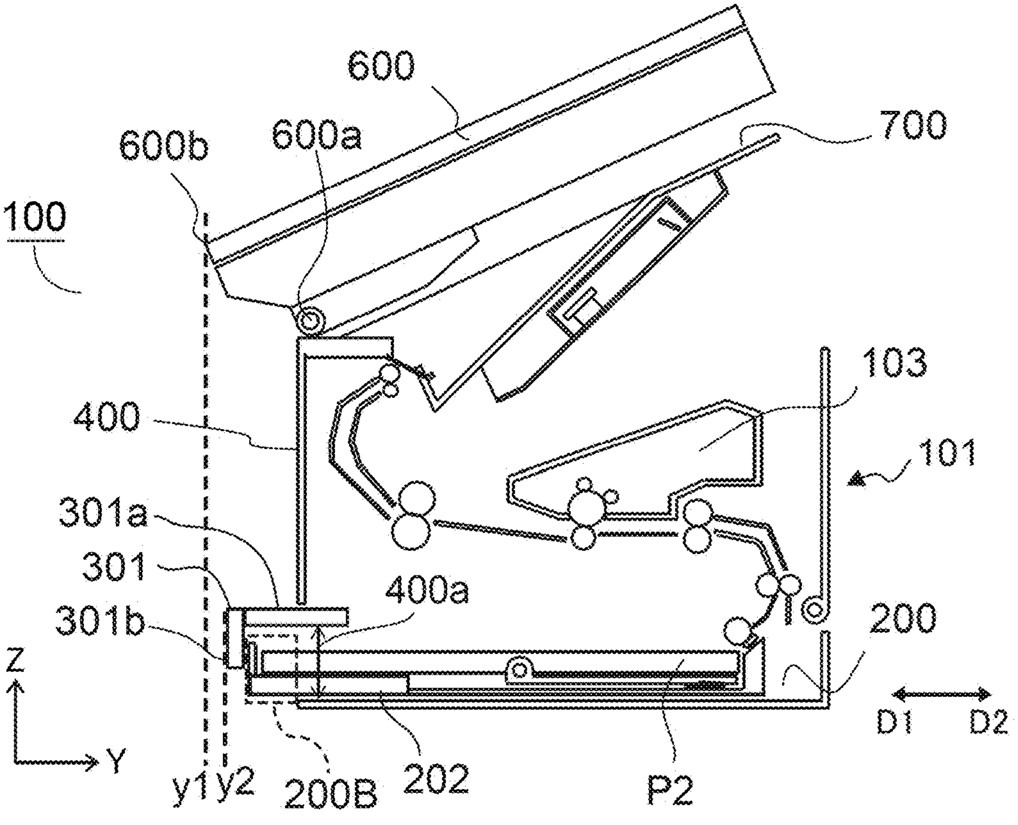
FIG. 6B is a cross-sectional view of the image forming apparatus of the third embodiment.

As illustrated in FIGS. 6A and 6B, a cover member 301 of the present embodiment can move (slide) with respect to the apparatus body 101, along the attachment direction D1 (i.e., the first direction) and the drawing direction D2 (i.e., the second direction) of the feeding cassette 200. The cover member 301 includes a horizontal portion 301*a* that extends in the X-axis direction and the Y-axis direction, and a vertical portion 301*b* that extends downward from an end portion of the horizontal portion 301*a* formed in the attachment direction D1.

The cover member 301 can move between a retracted position (i.e., a first position) illustrated in FIG. 6A, and a protruding position (i.e., a second position) illustrated in FIG. 6B. The protruding position is a position in which the cover member 301 protrudes backward from the back cover 400 of the apparatus body 101. In addition, the protruding position is a position retracted from the opening 400*a* toward the attachment direction D1 so that the part (i.e., the protruding portion 200B) of the feeding cassette 200 is allowed to protrude from the back cover 400 in the attachment direction D1, through the opening 400*a* of the back cover 400. The retracted position is a position in which the cover member 301 is retracted frontward from the protruding position. In the protruding position, when viewed from above, the horizontal portion 301*a* of the cover member 301 covers at least a portion of (preferably an entirety of) the protruding portion 200B of the feeding cassette 200 in the extension state. In this configuration, it is possible to prevent foreign substance from falling into the feeding cassette 200 and onto the long sheet P2. In the retracted position, the vertical portion 301*b* of the cover member 301, together with the back cover 400, forms the external appearance surface of the image forming apparatus 100 on the back side.

The cover member 301 moves to the protruding position by sliding from the retracted position in the attachment direction D1, and moves to the retracted position by sliding from the protruding position in the drawing direction D2. In the present embodiment, the cover member 301 moves from the retracted position to the protruding position by the back-end unit 202 of the feeding cassette 200 pushing the cover member 301 when the feeding cassette 200 in the extension state is attached to the apparatus body 101.

Modification

In the first embodiment, the cover member 300 pivots, for example; and in the third embodiment, the cover member 301 moves along the attachment direction D1 and the drawing direction D2, for example. However, the mode of movement of the cover member is not limited to the above-described movements. For example, a plurality of modes of movement may be combined with each other. Specifically, when the feeding cassette 200 in the extension state is attached to the apparatus body 101, the cover member may pivot upward and then slide in the attachment direction D1.

Other Modifications

In the above-described embodiments, the description has been made for the configuration that includes the image reading portion 600, which reads image information from a document and which is an example of the upper unit. However, the upper unit is not limited to this. For example, the upper unit may be an exterior member (i.e., a top cover) which forms at least a portion of the top surface of the apparatus body 101, and in which a stacking portion (i.e., a discharging tray) is formed. In this case, a sheet on which an image is formed is stacked on the stacking portion. In another case, the upper unit may be a so-called sheet-discharging option unit used for increasing destinations to which sheets are discharged, or for performing a process, such as a binding process, on sheets.

In the above-described embodiments, the feeding cassette 200 can be extended by moving the back-end unit 202 of the feeding cassette 200. However, the present disclosure is not limited to this. For example, long sheets can be stored in the feeding cassette 200 by attaching an attachment, which can be detached from the feeding cassette 200, to the feeding cassette 200. In another case, two types of feeding cassettes 200 may be prepared, and one of which may be selected by a user. In this case, one of the two types of the feeding cassettes 200 may be a model for storing sheets that are not long, and the other may be a model for storing long sheets.

Since the configurations of the cover members 300 and 301 of the above-described embodiments are merely examples, the cover member may have another configuration. For example, the cover member may have a configuration that allows the cover member to expand and contract in accordance with the length of the feeding cassette 200 (that is, the amount of protrusion of the cover member with respect to the apparatus body 101 may be changed). The cover member may be moved between the protruding position and the retracted position by an actuator, such as a motor or a solenoid, driving the cover member.

In the above-described embodiments, the description has been made, as an example, for the image forming apparatus that includes the direct-transfer electrophotographic unit, as the image forming portion. However, the image forming portion is not limited to this. For example, the image forming portion may include a plurality of process units, and may form a color image on a sheet by using toners with a plurality of colors. In another case, the image forming portion may be an intermediate-transfer electrophotographic unit in which a toner image formed on an image bearing member (i.e., a photosensitive drum) is primary-transferred onto an intermediate transfer member, such as an intermediate transfer belt, and then the toner image is secondary-transferred from the intermediate transfer member onto a sheet. The image forming portion is not limited to an image forming portion that has the electrophotographic system. For example, the image forming portion may be an ink-jet printing unit that forms an image on a sheet by jetting ink from a nozzle.

Thus, in the present disclosure, it is possible to provide an image forming apparatus that is unlikely installed in an improper position.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-131546, filed on Aug. 10, 2023, which is hereby incorporated by reference herein in its entirety.

What is claimed is:

1. An image forming apparatus comprising:

an apparatus body configured to accommodate an image forming portion configured to form an image on a sheet, the apparatus body including a side surface in a first direction having an opening;

a sheet storage portion configured to store a sheet to be fed to the image forming portion, the sheet storage portion being configured to be attached to a lower portion of the apparatus body toward the first direction and drawn from the apparatus body toward a second direction opposite to the first direction;

an upper unit disposed on a top portion of the apparatus body, the upper unit being configured to pivot around an axis that intersects the first direction and move between a closed position and an open position, the closed position being a position in which a bottom surface of the upper unit faces a top surface of the apparatus body, the open position being a position above the closed position; and a cover member configured to move between a first position and a second position, the first position being a position in which the cover member covers at least a part of the opening, the second position being a position retracted from the opening toward the first direction such that the cover member allows a part of the sheet storage portion to protrude from the side surface of the apparatus body through the opening in the first direction, wherein an edge portion of the cover member in the first direction in a case where the cover member is located in the second position is positioned in the second direction relative to a most protruding position to which an edge portion of the upper unit in the first direction protrudes to a maximum extent in the first direction in a period of time in which the upper unit moves from the closed position to the open position.

2. The image forming apparatus according to claim 1, wherein if a position of the edge portion of the upper unit in a case where the upper unit is located in the closed position is a third position, and a position of the edge portion of the upper unit in a case where the upper unit is located in the open position is a fourth position, the fourth position is positioned in the first direction relative to the third position, and wherein the edge portion of the cover member in a case where the cover member is located in the second position is positioned in the second direction relative to the fourth position.

3. The image forming apparatus according to claim 2, wherein the most protruding position of the upper unit is the fourth position.

4. The image forming apparatus according to claim 2, wherein the edge portion of the cover member in a case where the cover member is located in the second position is positioned between the third position and the fourth position in the first direction.

5. The image forming apparatus according to claim 1, wherein if a position of the edge portion of the upper unit in a case where the upper unit is located in the closed position is a third position, and a position of the edge portion of the upper unit in a case where the upper unit is located in the open position is a fourth position, the third position is positioned in the first direction relative to the fourth position, and wherein the edge portion of the cover member in a case where the cover member is located in the second position is positioned in the second direction relative to the third position.

6. The image forming apparatus according to claim 5, wherein the most protruding position of the upper unit is the third position.

7. The image forming apparatus according to claim 5, wherein the edge portion of the cover member in a case where the cover member is located in the second position is positioned between the third position and the fourth position in the first direction.

8. The image forming apparatus according to claim 1, wherein the most protruding position of the upper unit is a position of the edge portion of the upper unit when the upper unit is located in a position between the closed position and the open position.

9. The image forming apparatus according to claim 1, wherein the sheet storage portion is configured to be changed between a first state and a second state, the first state being a state where a length of the sheet storage portion in the first direction is a first length, the second state being a state where the length of the sheet storage portion in the first direction is a second length longer than the first length, and wherein in a case where the sheet storage portion in the second state is attached to the apparatus body, the part of the sheet storage portion protrudes from the side surface of the apparatus body in the first direction.

10. The image forming apparatus according to claim 1, wherein in a state where the part of the sheet storage portion protrudes from the side surface of the apparatus body in the first direction and the cover member is located in the second position, the part of the sheet storage portion is covered at least partially by the cover member when viewed from above.

11. The image forming apparatus according to claim 1, wherein the apparatus body includes a feeding member configured to feed a sheet from the sheet storage portion, and a discharging member configured to discharge a sheet on which an image is formed by the image forming portion, and wherein both of a sheet feeding direction of the feeding member and a sheet discharging direction of the discharging member are oriented in the second direction.

12. The image forming apparatus according to claim 1, wherein the cover member is configured to pivot with respect to the apparatus body around an axis that extends in a direction that intersects the first direction.

13. The image forming apparatus according to claim 1, wherein the cover member is configured to move with respect to the apparatus body along the first direction and the second direction.

14. The image forming apparatus according to claim 1, wherein the image forming portion includes a cartridge configured to be attached to and detached from the apparatus body, and wherein the upper unit is configured to be moved from the closed position to the open position in a case where the cartridge is attached to or detached from the apparatus body.

15. The image forming apparatus according to claim 1, wherein the upper unit includes an image reading portion configured to read image information from a document.

16. The image forming apparatus according to claim 1, wherein the upper unit includes a stacking portion on which a sheet on which an image has been formed by the image forming portion is stacked.

* * * * *